United States Patent
Kjær et al.

(10) Patent No.: US 10,273,938 B2
(45) Date of Patent: Apr. 30, 2019

(54) RAMPING POWER IN A WIND TURBINE DEPENDENT ON AN ESTIMATED AVAILABLE WIND POWER

(71) Applicant: VESTAS WIND SYSTEMS A/S, Aarhus N (DK)

(72) Inventors: Martin Ansbjerg Kjær, Harlev J (DK); Jesper Sandberg Thomsen, Hadsten (DK); Jacob Krogh Kristoffersen, Viby J (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/735,524

(22) PCT Filed: Jun. 9, 2016

(86) PCT No.: PCT/DK2016/050174
§ 371 (c)(1),
(2) Date: Dec. 11, 2017

(87) PCT Pub. No.: WO2016/198077
PCT Pub. Date: Dec. 15, 2016

(65) Prior Publication Data
US 2018/0171974 A1    Jun. 21, 2018

(30) Foreign Application Priority Data

Jun. 11, 2015 (DK) .................. 2015 70363

(51) Int. Cl.
*F03D 9/00* (2016.01)
*H02P 9/04* (2006.01)
*F03D 7/02* (2006.01)

(52) U.S. Cl.
CPC ...... *F03D 7/028* (2013.01); *F05B 2270/1033* (2013.01); *F05B 2270/309* (2013.01); *F05B 2270/335* (2013.01); *Y02E 10/723* (2013.01)

(58) Field of Classification Search
CPC ...................................................... F03D 7/028
See application file for complete search history.

(56) References Cited

U.S. PATENT DOCUMENTS

| 7,679,215 B2 * | 3/2010 | Delmerico | ............ F03D 7/0284 |
| | | | 290/55 |
| 2009/0218819 A1 * | 9/2009 | Miller | ..................... H02J 3/386 |
| | | | 290/44 |

(Continued)

FOREIGN PATENT DOCUMENTS

| CN | 101521380 A | 9/2009 |
| CN | 102044880 A | 5/2011 |

(Continued)

OTHER PUBLICATIONS

Danish Patent and Trademark Office Search Report for Application No. PA 2015 70363 dated Jan. 7, 2016.

(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

The invention relates to a control system for a wind turbine. The wind turbine comprises a power generator configured to generate power dependent on a power request. The control system comprises a ramp rate limiter configured to restrict a rate of change of the power request according to a rate of change limit and configured to determine the rate of change limit dependent on a power difference between the power request and an estimated available wind power.

13 Claims, 6 Drawing Sheets

(56) References Cited

U.S. PATENT DOCUMENTS

| | | | |
|---|---|---|---|
| 2011/0273129 A1* | 11/2011 | Coe | H02J 7/007 |
| | | | 320/101 |
| 2012/0139247 A1 | 6/2012 | Krueger | |
| 2012/0310426 A1* | 12/2012 | Tarnowski | F03D 7/0272 |
| | | | 700/287 |
| 2014/0152010 A1 | 6/2014 | Larsen et al. | |
| 2014/0152105 A1* | 6/2014 | Yasugi | H02J 3/00 |
| | | | 307/52 |
| 2015/0267686 A1* | 9/2015 | Kjæet al. | F03D 7/0224 |
| | | | 290/44 |
| 2017/0009738 A1* | 1/2017 | Brogan | F03D 7/0276 |

FOREIGN PATENT DOCUMENTS

| | | | |
|---|---|---|---|
| CN | 102803716 A | 11/2012 | |
| CN | 103328818 A | 9/2013 | |
| DE | 102013204600 A1 | 9/2014 | |
| EP | 2096299 A2 | 9/2009 | |
| WO | WO-2014026688 A1 * | 2/2014 | F03D 7/0224 |
| WO | 2016198077 A1 | 12/2016 | |

OTHER PUBLICATIONS

PCT Written Opinion of the International Searching Authority for Application No. PCT/DK2016/050174 dated Jun. 9, 2016.
International Search Report for Application No. PCT/DK2016/050174 dated Sep. 22, 2016.
SIPO of the People's Republic of China First Office Action for Application No. 201680040225.7 dated Dec. 29, 2018.

\* cited by examiner

RAMPING POWER IN A WIND TURBINE DEPENDENT ON AN ESTIMATED AVAILABLE WIND POWER

FIELD OF THE INVENTION

The invention relates to a method for controlling a wind turbine, particularly to a method for controlling a wind turbine during power ramping.

BACKGROUND OF THE INVENTION

Wind turbines may be operated in a de-rated mode where the wind turbine is controlled to produce an amount of power which is lower than the amount of power that can be produced considering the available wind power. The purpose of operating the wind turbine in a de-rated mode may be to establish a power reserve that can be released if needed.

The de-rated wind turbine may be requested to ramp production up very fast to full production, e.g. in order to meet an increased power demand at the grid. The full production may be the maximum production being possible with a given available wind power. The ramping demand may be in the form of an external power reference from a grid operator or other external source.

The fast ramping of power up to full production may lead to various undesired effects such as undesired variations in the produced power.

Accordingly, there is a need to improve the wind turbine's capability to handle power ramping demands.

US2012139247A1 discloses a wind power plant, including a generator driven by a rotor for generating electrical power and a controller that includes a pitch module for adjusting a pitch angle of blades of the rotor. The controller has an input for a required power reserve and determines a target pitch angle depending on an operating point of the wind power plant. A secondary pitch controller is also provided, which includes a detector for available power and a dynamic offset module. Input signals for the available reserve power determined by the detector, the required reserve power and the generated electrical power are applied to the dynamic offset module, which is designed to determine a value for a pitch angle offset. An activation element varies the target pitch angle by the pitch angle offset.

SUMMARY OF THE INVENTION

It is an object of the invention to improve the control of a wind turbine in relation to handling power ramping demands, particularly to improve the wind turbine's capability to handle external power references which demands high ramping rates.

It is a further object of the invention to reduce undesired effects caused by fast ramping of power up to full production. Such undesired effects may include undesired variations, e.g. overshoot, in generated power or undesired variations, e.g. reduction, in generator speed.

It may a further object of the invention to reduce structural loads of the wind turbine due to power ramping demands.

In a first aspect of the invention there is provided a method for controlling a wind turbine comprising
increasing production of electric power dependent on an increasing power request, where a rate of change of the increasing power request is limited by a rate of change limit,
determining an estimate of an available wind power,
determining a power difference between the power request and the estimated available wind power,
setting the rate of change limit to a reduced rate of change limit dependent on the power difference.

Advantageously, by setting the rate of change limit to a new rate of change limit which is lower than the initial rate of change limit the produced power may be ramped up slow enough to allow the pitch to be adjusted so that the power taken in by the rotor is increased (due to the pitch adjustment) at a rate which is closer to, or substantially equal to, the rate at which produced power is increased compared to the initial power ramp rate.

According to an embodiment, the method comprises setting the rate of change limit to a reduced rate of change limit when the power difference is less than a threshold. Accordingly, invoking a change in the rate of change limit may be conditioned on a comparison of the power difference with threshold. For example, the threshold may in the range from −300 kW to 300 kW.

As examples, the rate of change limit, i.e. the initial rate of change limit, may be in the range from 20 kW/s to 4 MW/s, whereas the reduced rate of change limit may be in the range from 5 kW/s to 200 kW/s.

Normally, the power request initially sets a power to be generated which is lower than the available power in the wind. Accordingly, the wind turbine may be operated in a de-rated mode. Embodiments of the invention may be particularly suited for situations where the wind turbine is operated in a de-rated mode and where the available wind power is lower than a rated power of the wind turbine.

According to an embodiment, the initial power may also be a result of a low voltage event, which can occur when the utility grid experiences a fault where the grid voltage drop from a first level and to a second lower level. Embodiments of the present invention may be used to provide an increasing power request after the termination of the low voltage event to ramp back the voltage to the final power of normal operation. The initial power is in this situation the resulting voltage level of the turbine upon termination of the low voltage event, and the final power is the desired voltage level at which the turbine should resume to.

According to an embodiment, the method comprises controlling a pitch of a blade of the wind turbine dependent on a difference between a generator speed reference and a measured generator speed until the pitch reaches a pitch reference determined dependent on a wind velocity. For example, the wind turbine may be operated in a full load mode during de-rated operation using a full load controller until the pitch reaches an optimum pitch or other predetermined pitch reference.

According to an embodiment, the method comprises controlling the production of electric power dependent on the difference between the generator speed reference and the measured generator speed, and controlling the pitch dependent on the pitch reference after the pitch has reached the pitch reference (Oopt). For example, after the pitch has reached the optimum pitch, or other predetermined pitch reference the wind turbine may be operated in a partial load mode in order to maximise extraction of wind energy.

A second aspect of the invention relates to a control system for a wind turbine, where the wind turbine comprises a power generator configured to generate power dependent on a power request, the control system comprises
a ramp rate limiter configured to restrict a rate of change of the power request according to a rate of change limit and configured to determine the rate of change limit dependent on a power difference between the power request and an estimated available wind power.

According to an embodiment of the control system, the ramp rate limiter is configured to restrict the rate of change of the power request according to a first rate of change limit and a second rate of change limit, where the second rate of change is lower than the first rate of change, and where the ramp rate limiter is configured to select the second rate of change limit dependent on the power difference.

A third aspect of the invention relates to a wind turbine comprising a control system according to the second aspect.

A fourth aspect of the invention relates to a computer program product directly loadable into an internal memory of a digital computer, the computer program product comprising software code portions for performing the steps of the method according to the first aspect when the computer program product is run on the computer.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
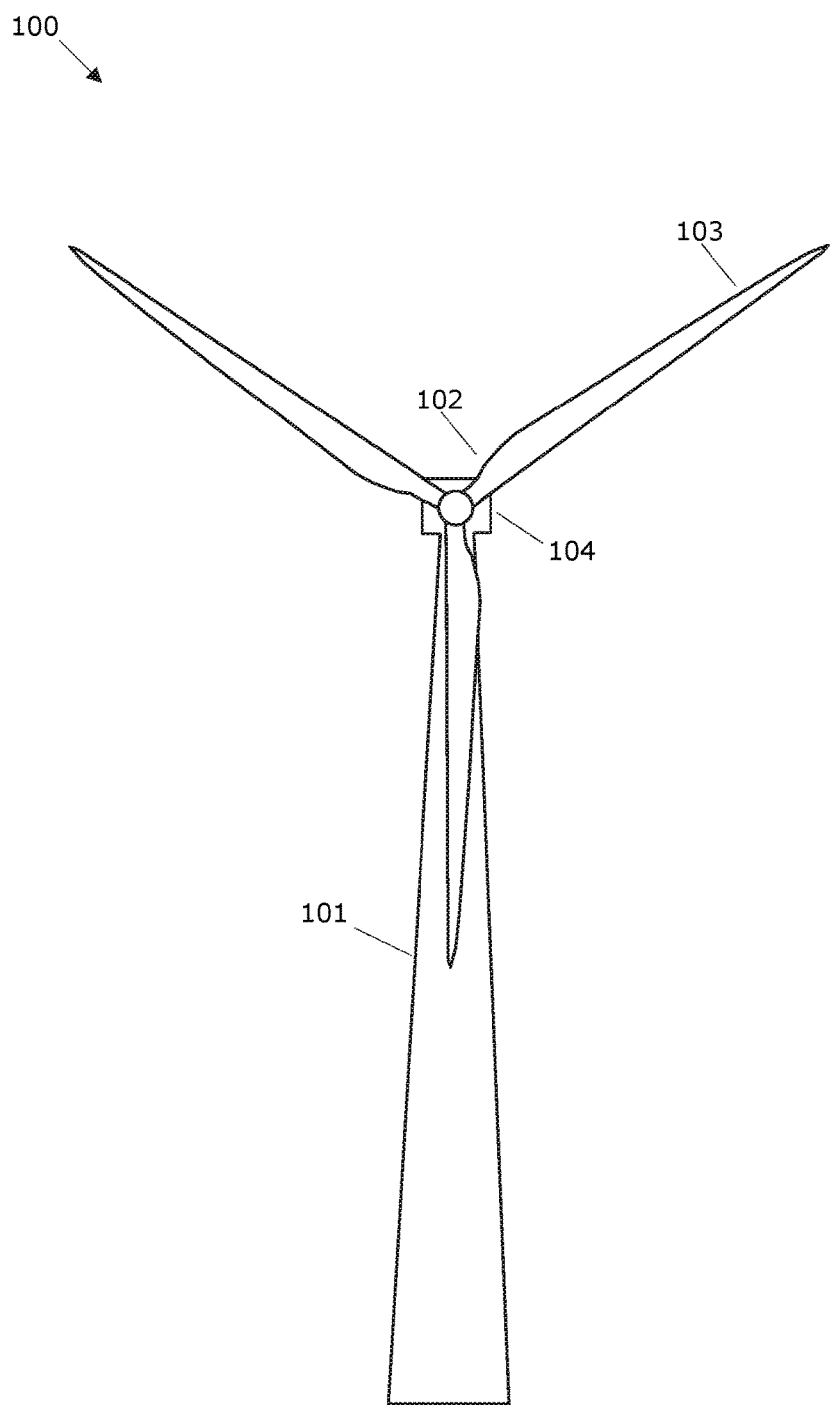
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g. in order to maximise uptake of the wind energy. The blades are pitched by a pitch system which includes actuators for pitching the blades dependent on a pitch request.

Figure 2:
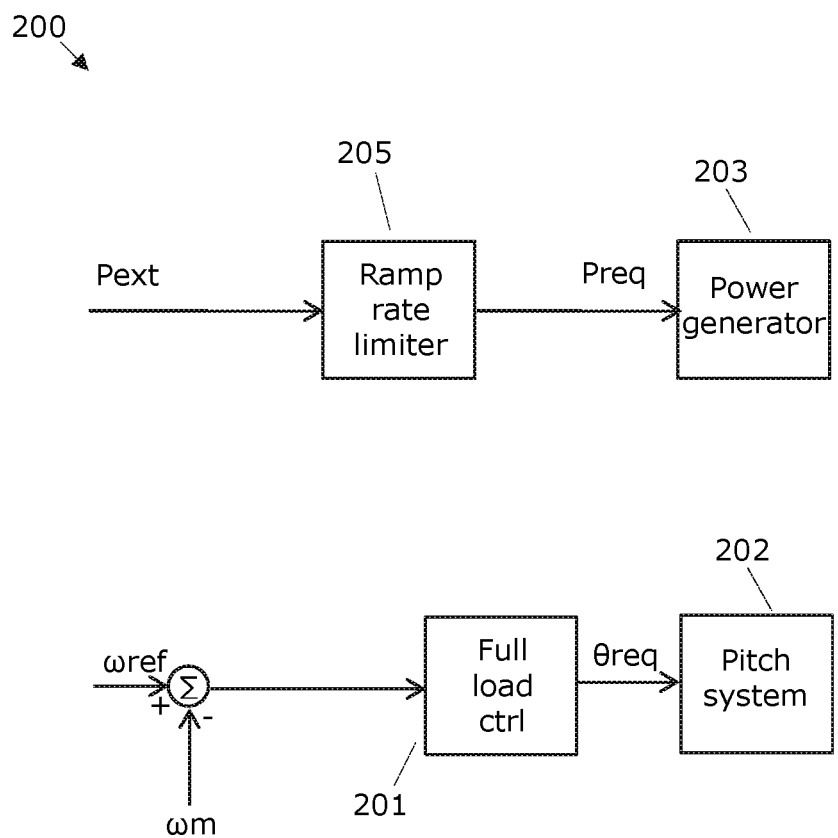
FIG. 2 shows a control system of the wind turbine where the control system is in a full load state, FIG. 3 show curves illustrating generated power, generator speed and available wind power for a wind turbine operated in a reduced power mode.

FIG. 2 shows a configuration 200 of a wind turbine in a situation where a control system of the wind turbine is configured according to a full load state.

The control system of the wind turbine comprises a full load controller 201 which is activated in the full load state to determine the pitch request θreq for the pitch system 202. During full load the pitch request is determined dependent on a difference between a generator speed reference ωref and a measured generator speed ωm.

The power generator 203 is controlled by means of the power request Preq. During full load the power request Preq is determined based on an external power reference Pext.

The control system of the wind turbine further comprises a ramp rate limiter 205 configured to restrict a rate of change of the power request Preq according to a rate of change limit. For example, the power request Preq may be set equal to the external power reference Pext for rate or changes of the external power reference Pext below or equal to the rate of change limit. For rate or changes of the external power reference Pext above the rate of change limit, the rate of change of the power request Preq is restricted to the rate of change limit.

The external power reference Pext may be provided by a grid operator or other external source.

The power request Preq is supplied to the power generator 203. The power generator may contain a generator controller which receives the power request Preq and controls the generator to produce the requested power Preq. Accordingly, the power generator may be defined as a power generator system containing the generator controller, the generator, power converters/inverters and other units and which is configured to produce power according to the requested amount.

The pitch request θreq is supplied to the pitch system 202 which performs pitch adjustment of the blades 103. The pitch system 202 may contain a pitch controller with receives the pitch request θreq and controls the pitch actuators to set the pitch to the requested pitch.

The control system of the wind turbine also comprises a partial load controller which is activated in a partial load state to determine the power request Preq for the power generator. During partial load the power request is determined dependent on a speed difference between the generator speed reference ωref and the measured generator speed ωm.

The partial load controller is not shown in the full load configuration 200 since during full load the generator request Preq is determined based on an external power reference Pext and, therefore, the partial load controller may be inactivated during full load control.

The partial load state is characterised in that the wind speed is not high enough to enable generation of the nominal or rated electrical power from the generator. In this state the pitch θ and the generator speed are controlled to optimize aerodynamic efficiency of the wind turbine 100. Therefore, the pitch request θreq may be set to an optimum pitch reference θopt which maximises the aerodynamic efficiency of the rotor. The generator speed ωr may be controlled to extract as much power as possible by tracking the desired generator speed ωref. In the partial load state the generator speed ωr is controlled via the power request Preq which affects generator torque.

Accordingly, in partial load, the partial load controller calculates the power request Preq that minimises the speed difference between the generator speed reference ωref and the measured generator speed ωm.

The full load state is characterised in that the wind speed v is high enough to enable generation of a rated electrical power. Therefore, the generator speed and generator power may be controlled to achieve a desired power production, e.g. a rated power or a reduced power. The power request Preq is set to the desired power production. The generator speed reference ωref is determined dependent on the desired power production. In the full load state the generator speed ωr is controlled via the pitch request θreq.

The rated power level is the power level that the wind turbine is designed to generate at or above rated wind speed. In some circumstances the wind turbine may be operated to generate a maximum power which is higher than the rated power.

Accordingly, in full load, the full load controller 204 calculates the pitch request θreq that minimises the difference between the generator speed reference ωref and the measured generator speed ωm.

It is noted that the generator speed ωr and the rotor speed may be linked by the gear ratio of the gear connecting the rotor with the generator shaft. Accordingly, the generator speed reference ωref and may equivalently be set as a rotor speed reference and a measured rotor speed may equivalently be used instead of a measured generator speed. Some wind turbines do not utilise a gear box in which case the generator speed and rotor speed are equal. It is also noted that the power generator 203 may equivalently be controlled by means of a torque request instead of the power request Preq. Accordingly, it is understood that the power request Preq may be in the form of power or torque reference for the power generator 203.

The wind turbine may be operated in a de-rated mode in the full load configuration 200, i.e. in a mode where the power request Preq is set to a reduced power reference. The de-rated mode is also referred to as a reduced power mode. The reduced power reference may be any power which is lower than the rated power of the wind turbine. In the de-rated power mode the pitch is controlled according to a generator speed reference ωref which may be de-rated, i.e. reduced, or not depending on the design of the wind turbine.

Thus, the de-rated power mode refers to a situation where the wind turbine is operated to produce a reduced amount of power, i.e. a situation where the wind turbine is controlled to produce an amount of power which is lower than power that can be produced with the available wind power.

For example, the wind turbine may be operated in a de-rated mode in order to establish a power reserve that can be released quickly e.g. if a problem with the grid arises. Accordingly, at demand, the wind turbine has to ramp the power very fast back to full production.

Figure 3:
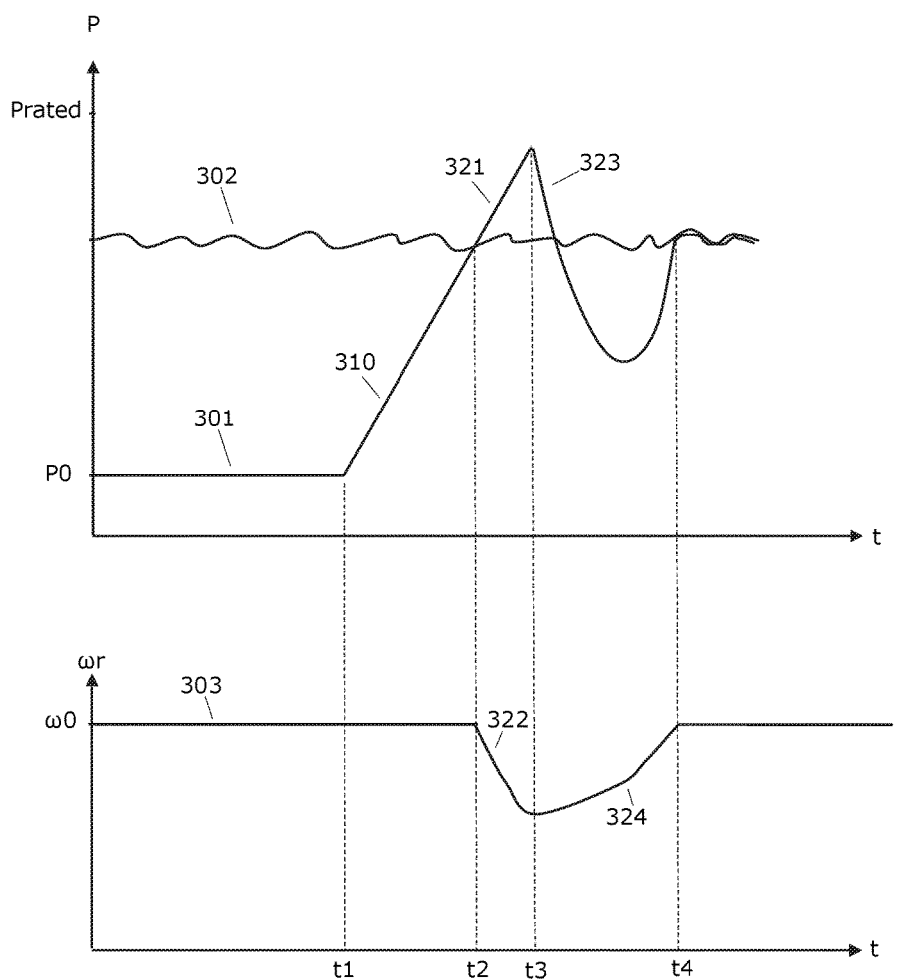

FIG. 3 illustrates generated power 301 and generator speed 303 for a wind turbine operated in the reduced power mode. Curve 302 illustrates the available wind power. The reduced power has the value P0 and the associated generator speed has the value ω0.

At t1 the wind turbine receives a demand, e.g. in the form of an external power reference Pext, to ramp to full power production, i.e. the power production which is possible with the available wind power. In this case, the available wind power is below the rated power Prated. During the power ramp, the pitch as determined by the full load controller 201 is adjusted in order to increase extraction of wind energy.

It is noted that a switch from full load to partial load operation may be invoked when the pitch request θreq approaches an optimum pitch value θopt. θopt is a predetermined pitch angle which provides an optimum aerodynamic efficiency for a given wind speed and generator speed.

Accordingly, a comparison of the pitch request θreq and the optimum pitch value θopt may be used as a condition for determining when to switch to the partial load state.

At time t2 the generated power 301 reaches the available wind power 302. However, the available wind power 302 is not known by the control system (i.e. the control system comprising the full and partial load controllers) and, therefore, the control system continues ramping the power via the output from the ramp rate limiter 205.

Since the power is ramped up faster than the available bandwidth of the control system, the pitch is not adjusted fast enough to balance the power taken in by the rotor and the produced power implying that the control system continues ramping the power. Accordingly, an undesired power overshoot is generated before the pitch reaches a desired pitch value, e.g. the optimum pitch value.

Due to the kinetic energy stored in the rotor 102 the wind turbine is able to increase power production above the available wind power 302. Accordingly, an undesired power overshoot 321 is created. Since the power taken in by the rotor 302 is now smaller then power taken from the rotor the generator speed 303 drops 322—due to extraction of stored kinetic energy.

For example, an overshoot 321 may be about 25% of rated power of the wind turbine.

At time t3 the control system of the wind turbine switches to the partial load state. The switch may be triggered in response to a comparison of the pitch request θreq and the optimum pitch value θopt as mentioned before.

The partial load controller determines the power request Preq dependent on the speed difference between the generator speed reference ωref and the measured generator speed ωm. Due to speed drop 322, the partial load controller sees a speed error and, therefore, reduces the power production 323. The power production 323 remains below the available wind power 302 until the rotor speed car has increased 324 back to a desired generator speed reference, e.g. the generator speed ω0, at time t4.

Thus, the increase of power up to the available power is not finished until time t4 when the produced power stabilises at the available wind power 302 where the produced power may follow the variations in the available power.

The variations in produced power, i.e. the power overshoot 321 and the power reduction 323, are unacceptable for the grid and therefore should be avoided.

Figure 4:
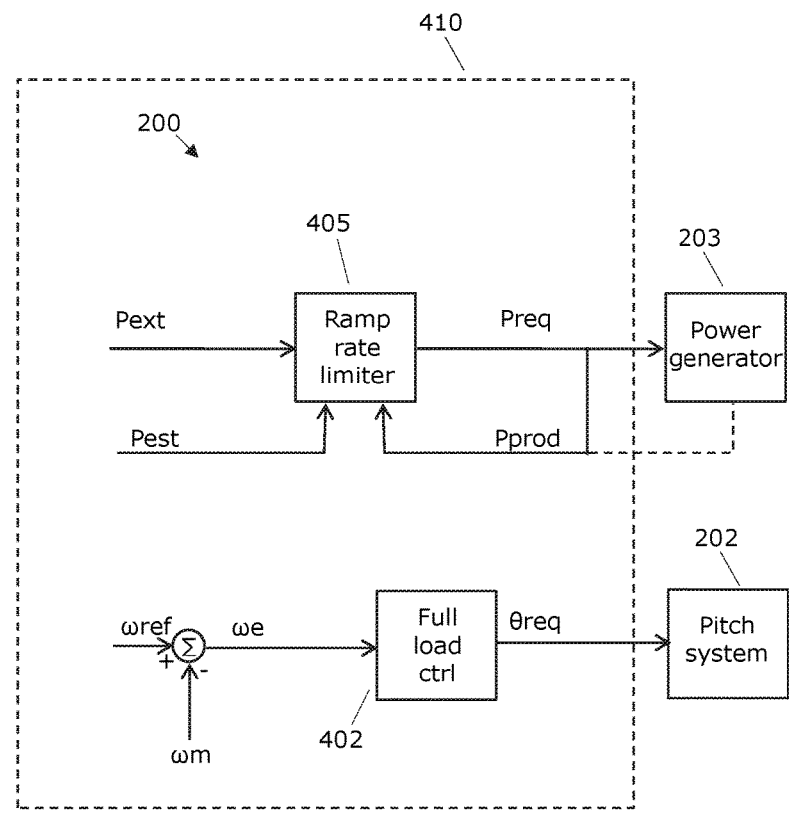
FIG. 4 shows a wind turbine control system configured with a ramp rate limiter.

FIG. 4 shows a control system 410 for a wind turbine, according to an embodiment of the invention, where the wind turbine comprises a power generator 203 configured to generate power dependent on a power request (Preq) and a pitch system 202 for adjusting the pitch of the blades dependent on the pitch request θreq. Accordingly, the control system 410 may be comprised by the wind turbine 100.

The control system 410 comprises a controller 402 configured to determine the pitch request θreq, i.e. a pitch control signal. The controller 402 may be a full load controller 201 as described in connection with FIG. 2. Therefore, the controller 402 may be configured to the determine the pitch request θreq dependent on a difference between a generator speed reference ωref and a measured generator speed ωm. For example, the controller 402, e.g. a PI controller, may determine the pitch request through a control algorithm so as to minimize the speed error we between the measured generator speed ωm and the generator speed reference ωref.

The control system 410 further comprises a ramp rate limiter 405 configured to restrict a rate of change of the power request Preq according to a rate of change limit similarly to the ramp rate limiter 205 in FIG. 2. The ramp rate limiter 405 is further configured to determine the rate of change limit dependent on a power difference between the power request Preq and an estimated available wind power Pest.

Instead of using the power request Preq, the control system 410 may be configured to determine the rate of change limit dependent on a power difference between the produced power (indicated by the dashed line between the power generator 203 and the ramp rate limiter 405) and the estimated available wind power Pest or between the external power reference Pext and the estimated available wind power. Thus, in general the control system 410 may be configured to determine the rate of change limit dependent on a power difference between a power parameter Pprod relating to the produced amount of power and the estimated available wind power Pest.

The estimated available wind power may be determined by predetermined power curves or look-up tables as a function of a measured wind speed. Several other methods for estimating available wind power may be used.

Figure 5:
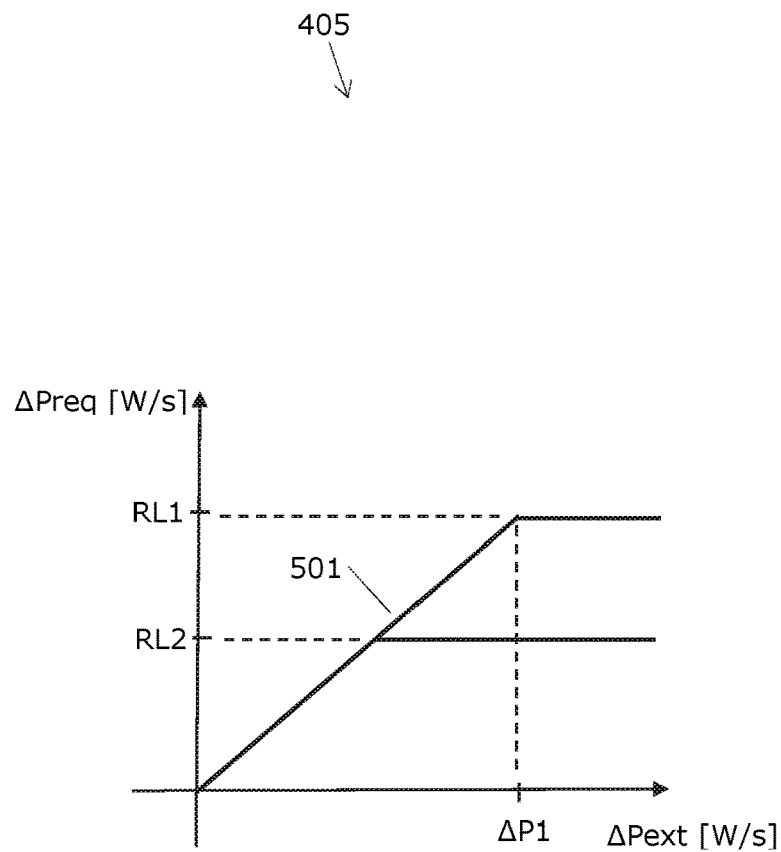
FIG. 5 shows an example of a ramp rate limiter.

FIG. 5 illustrates an example of a function of a ramp rate limiter 405. The ramp curve 501 illustrates that the rate of change of the power request ΔPreq (e.g. an increasing power request), is limited, i.e. restricted, by a first rate of change limit RL1 for rate of changes of the external power reference ΔPext above a rate of change limit ΔP1. The ramp rate limiter 405 includes a second ramp rate limit RL2 which is lower than the first rate of change limit RL1. In this example, the ramp rate limiter 405 is configured to select the second rate of change limit RL2 dependent on a power difference between the power request Preq (alternatively the power parameter Pprod) and the estimated available wind power Pest. Accordingly, dependent on the power difference the ramp rate limiter 405 (or other unit) is configured to set the rate of change limit to a reduced rate of change limit, e.g. the limit RL2.

Thus, the a ramp rate limiter 405 is configured to restrict a rate of change of the power request Preq according to a rate of change limit RL2 and configured to determine the rate of change limit RL2 dependent on a power difference between the power request Preq and the estimated available wind power. For example, the ramp rate limiter 405 may be configured to restrict a rate of change of the power request Preq according to a first rate of change limit RL1 and a second rate of change limit RL2, where the lower second rate of change limit RL2 is selectable dependent on the power difference.

The function of the ramp rate limiter 405 to set the rate of change limit to a reduced rate of change limit dependent on the power difference includes different ways of reducing the rate of change limit. For example, reducing the rate of change limit may be performed by:

setting the rate of change limit to a fixed reduced rate of change limit,
setting the rate of change limit to different reduced rate of change limits. For example, the rate of change limit may be gradually changed, e.g. reduced, as function of the power difference, time or other parameter. The different rate of change limits could be defined by a look-up table or a function. The look-up table or function could define the rate of change limits as a function of the power difference between the power request Preq and the estimated available wind power.

Thus, the function of the ramp rate limiter to restrict a rate of change of the power request could be performed according to one or more predetermined rate of change limits. The function of the ramp rate limiter to restrict a rate of change of the power request could also be performed in other ways, e.g. by determining the one or more reduced rate of change limits using a filter, e.g. a first order filter configured to determine filtered output values dependent on e.g. an inputted external power reference, which output values correspond to the reduced rate of change limits.

Figure 6:
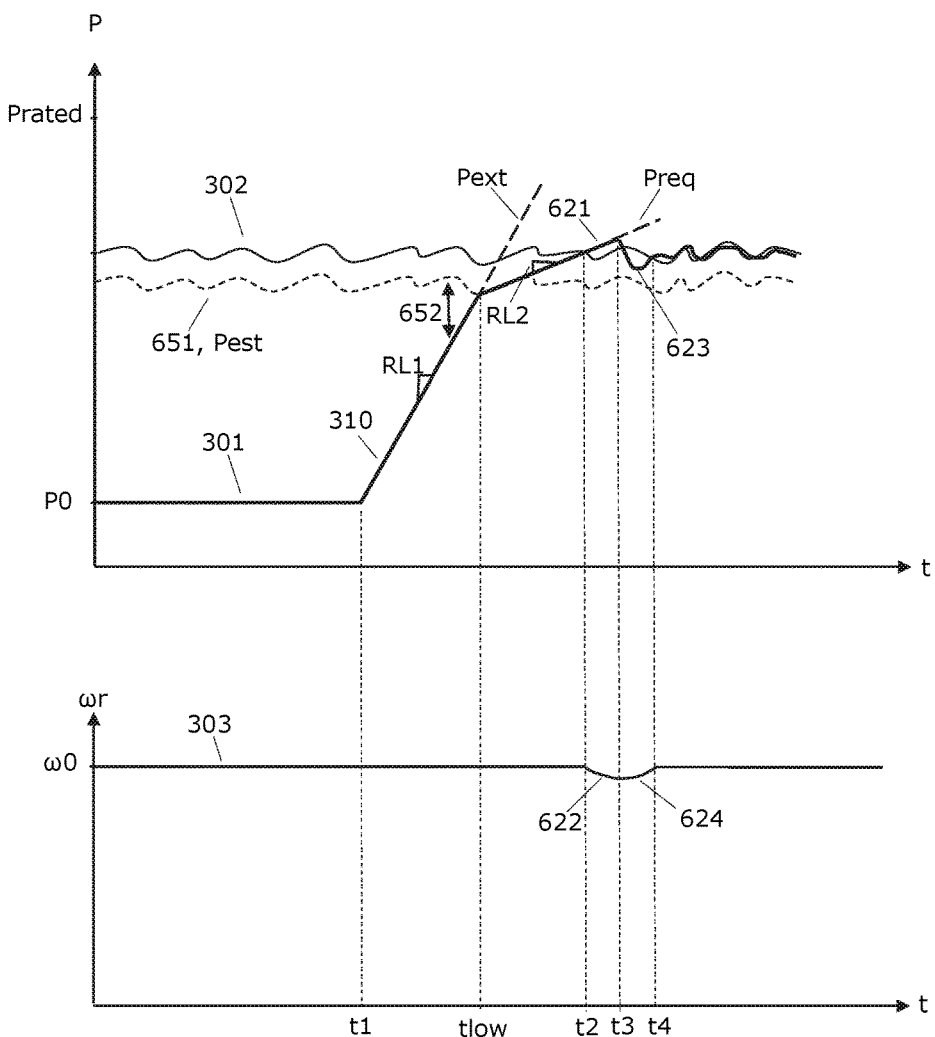
FIG. 6 shows curves that illustrate reduction in variations in produced power and generator speed in case of power ramping due a rate of change reduction in the power ramp rate when the power approaches the available wind power.

FIG. 6 illustrates generated power 301 and generator speed 303 in a situation similar to the situation in FIG. 3. Accordingly, elements (curves, details of the coordinate system) in FIG. 6 which has the same or similar purpose or meaning as an element in FIG. 3 are provided with the same reference numbers for convenience and are, therefore, not described in connection with FIG. 6.

FIG. 6 additionally shows the external power reference Pext and the related power request Preq. In the example, the external power reference Pext and the power request Preq increases beyond the available wind power 302.

It is noted that the generated power 301, 310 follows the power request Preq, possibly within some tolerances during full load control, at least as long as the available wind power is high enough to enable production of the requested power.

FIG. 6 also shows the estimated available wind power Pest, 651. The estimated available wind power is shown as being less than the available power 302. In practice it is not essential if the available wind power is estimated to be below, equal or above the actual available wind power as long as the estimate is sufficiently close to the available wind power, e.g. within a range of +/−5% of the available wind power.

Accordingly, FIG. 6 illustrates a method according to embodiment of the invention where the production of electric power is increased 310 dependent on an increasing power request Preq. The rate of change of the increasing power request Preq is limited by a rate of change limit RL1.

The method further comprises estimating an available wind power 651 and determining a power difference 652 between the power request Preq and the available wind power.

The power difference 652 is used for setting the rate of change limit (e.g. RL1) to a reduced rate of change limit (e.g. RL2), i.e. so that rate of change of the increasing power, i.e. ramped power 310, is set to a reduced rate of change dependent on the power difference 652. For example, the rate of change limit may be set to a reduced rate of change limit when the power difference 652 is less than a threshold, e.g. a predetermined threshold. For example, the the threshold may be in the range from −300 kW to 300 kW. The negative and positive thresholds take into account the situation where the power request is allowed to increase above the estimated available wind power 651. In an embodiment the threshold may be equal to 0 kW.

The setting of the rate of change limit to a reduced rate of change limit includes the possibility to set possibility to set the rate of change limit to one or more different reduced rate of change limits over time.

As illustrated in FIG. 6, the power request Preq initially sets a power P0 to be generated which is lower than the available power in the wind.

Embodiments of the invention may be particularly useful for reducing variations in power and generator speed, when the available wind power 302 is lower than a rated power Prated of the wind turbine.

At time t1, the external power reference Pext ramps up which causes an increase in the produced power 310. During the de-rated full load operation and during the power ramping 310 the pitch of the blades of the wind turbine is controlled dependent on the difference between a generator speed reference $\omega$ref and the measured generator speed $\omega$m until the pitch reaches a pitch reference determined dependent on a measured wind velocity and possibly dependent on the rotor speed, i.e. dependent on the tip-speed-ratio such as the optimum pitch value $\theta$opt.

In other words the pitch of the blades may be controlled in the de-rated full load state as long as the pitch is not constrained by an optimal power intake, i.e. a constraint set in terms of an optimum pitch reference $\theta$opt.

At time tlow the rate of change limit is changed from the initial rate of change RL1 to a reduced rate of change limit RL2. This may be triggered through a comparison of the power difference (e.g. Pest-Preq) with a threshold.

Accordingly, after time tlow the power 301 is ramped up with a lower rate of change limit.

At time t2, the generated power 301 reaches the available wind power 302. As described in FIG. 3 the available wind power 302 is not known by the control system and, therefore, the control system 410 may continue ramping the power via the output from the ramp rate limiter 405 so that a power overshoot 621 is created. However, due to the reduced ramp rate limit RL2 the power overshoot 621 is lower than the power overshoot 321 for the case where the ramp rate is not reduced. Accordingly, the power overshoot 621 may be made sufficiently small by use of a suitable low ramp rate limit RL2.

Similarly to the situation in FIG. 3, a drop 622 in generator speed 303 is created due to the power overshoot 621. However, since the power overshoot is reduced the drop in generator speed is also reduced.

At time t3 the control system of the wind turbine switches to the partial load state. The switch may be triggered in response to a comparison of the pitch request $\theta$req and a pitch reference such as the optimum pitch value $\theta$opt.

In the partial load state, the control system 410 controls the production of electric power dependent on the difference between the generator speed reference $\omega$ref and the measured generator speed $\omega$m, and controls the pitch dependent on the pitch reference (e.g. $\theta$opt) after the pitch has reached this pitch reference.

As explained in connection with FIG. 3, due to speed drop 622, the partial load controller sees a speed error and, therefore, reduces the power production 623. However, due to the reduced rate of change limit RL2, the reduction in power production 623 is significantly reduced.

At time t4, the produced power 301 is back at a level corresponding to the available wind power 302 and the rotor speed $\omega$r has increased 624 back to a desired generator speed reference (e.g. $\omega$0).

As illustrated in FIG. 6 the power reference Pext may continue increasing after tlow until Pext reaches a desired level, e.g. Prated. Similarly, the power request Preq may continue increasing at the reduced rate of change limit RL2, until Preq reaches the desired level such as Prated.

Due to the use of a reduced rate of change of the power ramping the total ramping time, i.e. the time from initiating ramping at t1 until time t4 when the produced power stabilises at the available wind power 302, may be reduced compared to not reducing the ramping rate.

Furthermore, due to the use of a reduced ramp rate, the variations in produced power may be made acceptable for the grid.

As an example, the rate of change limit RL1 is in the range from 20 kW/s to 4 MW/s and the reduced rate of change limit is in the range from 5 kW/s to 200 kW/s. For example, a fast rate of change could be around 1 MW/s and the reduced rate of change could be around 50 kW/s for a 3.3 MW wind turbine.

Since an undesired power overshoot 621, 321 may be generated during ramping for any power ramp rates, the method for invoking a reduced rate of change of the increasing power request is useful irrespective of the rate of change limit RL1 of the power ramp.

Embodiments of invention can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine, the method comprising:
   increasing production of electric power dependent on an increasing power request (Preq), where a rate of change of the increasing power request (Preq) is limited by a rate of change limit (RL1),
   determining an estimate of an available wind power,
   determining a power difference between the power request (Preq) and the estimated available wind power, and
   setting the rate of change limit to a reduced rate of change limit (RL2) dependent on the power difference.

2. The method according to claim 1, further comprising:
   setting the rate of change limit to a reduced rate of change limit when the power difference is less than a threshold.

3. The method according to claim 2, wherein the threshold is in a range from −300 kW to 300 kW.

4. The method according to claim 1, wherein the rate of change limit is in a range from 20 kW/s to 4 MW/s.

5. The method according to claim 1, wherein the reduced rate of change limit is in a range from 5 kW/s to 200 kW/s.

6. The method according to claim 1, wherein the power request (Preq) initially sets a power to be generated (P0) which is lower than the estimated available power in the wind.

7. The method according to claim 1, wherein setting the rate of change limit to the reduced rate of change limit is performed when the estimated available wind power is lower than a rated power of the wind turbine.

8. The method according to claim 1, further comprising:
controlling a pitch of a blade of the wind turbine dependent on a difference between a generator speed reference ($\omega$ref) and a measured generator speed ($\omega$m) until the pitch reaches a pitch reference ($\theta$opt) determined dependent on a wind velocity.

9. The method according to claim 8, further comprising:
controlling the production of electric power (341) dependent on the difference between the generator speed reference ($\omega$ref) and the measured generator speed ($\omega$m), and
controlling the pitch dependent on the pitch reference ($\theta$opt), after the pitch has reached the pitch reference ($\theta$opt).

10. A control system for a wind turbine, where the wind turbine comprises a power generator configured to generate power dependent on a power request (Preq), the control system comprises:
a ramp rate limiter configured to restrict a rate of change of the power request (Preq) according to a rate of change limit (RL2) and configured to determine the rate of change limit dependent on a power difference between the power request (Preq) and an estimated available wind power.

11. The control system for the wind turbine according to claim 10, wherein the ramp rate limiter is further configured to restrict the rate of change of the power request (Preq) according to a first rate of change limit (RL1) and a second rate of change limit (RL2), where the second rate of change limit is lower than the first rate of change limit, and where the ramp rate limiter is configured to select the second rate of change limit dependent on the power difference.

12. A wind turbine comprising the control system according to claim 10.

13. A computer program product directly loadable into an internal memory of a digital computer, the computer program product comprising software code which when executed by one or more computer processors performs an operation for controlling a wind turbine, the operation comprising:
increasing production of electric power dependent on an increasing power request (Preq), where a rate of change of the increasing power request (Preq) is limited by a rate of change limit (RL1),
determining an estimate of an available wind power,
determining a power difference between the power request (Preq) and the estimated available wind power, and
setting the rate of change limit to a reduced rate of change limit (RL2) dependent on the power difference.

* * * * *